(12) United States Patent
Takahashi et al.

(10) Patent No.: US 11,894,534 B2
(45) Date of Patent: Feb. 6, 2024

(54) BATTERY UNIT

(71) Applicant: HONDA MOTOR CO., LTD., Tokyo (JP)

(72) Inventors: Masaki Takahashi, Saitama (JP); Tsubasa Ikeya, Saitama (JP); Kenta Sugitate, Saitama (JP); Kazuya Nakano, Saitama (JP); Ryo Kaneshima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 287 days.

(21) Appl. No.: 17/182,729

(22) Filed: Feb. 23, 2021

(65) Prior Publication Data
US 2021/0273275 A1    Sep. 2, 2021

(30) Foreign Application Priority Data

Mar. 2, 2020  (JP) .................................. 2020-035289

(51) Int. Cl.
*H01M 10/613* (2014.01)
*H01M 10/625* (2014.01)
(Continued)

(52) U.S. Cl.
CPC ............. *H01M 10/613* (2015.04); *B60K 1/04* (2013.01); *H01M 10/625* (2015.04);
(Continued)

(58) Field of Classification Search
CPC ........... H01M 10/625; H01M 10/6563; H01M 2220/20; H01M 10/613; B60K 2001/0433
See application file for complete search history.

(56) References Cited

U.S. PATENT DOCUMENTS

2006/0096797 A1* 5/2006 Tsuchiya ............. H01M 50/249
                                                    180/68.5
2010/0071980 A1    3/2010 Kokaji et al.
(Continued)

FOREIGN PATENT DOCUMENTS

CN    107206890 A    9/2017
CN    107732064 A    2/2018
(Continued)

OTHER PUBLICATIONS

Machine translation of JPS 2008-282548 (cited on Nov. 15, 2022 IDS) (Year: 2008).*

*Primary Examiner* — Eugenia Wang
(74) *Attorney, Agent, or Firm* — Paratus Law Group, PLLC

(57) ABSTRACT

A battery unit equipped in a vehicle includes a battery, a case accommodating the battery, an upper surface covering material covering an upper surface of the battery in the case, an intake portion provided on the upper surface covering material and configured to take in air from an outside of the case to above the battery, a lower surface covering material covering a lower surface of the battery in the case, an exhaust portion provided on the lower surface covering material and configured to discharge air that has cooled or heated the battery, a fan disposed below the lower surface covering material, configured to take in air discharged from the exhaust portion, and discharge the air between the lower surface covering material and a bottom surface of the case.

5 Claims, 5 Drawing Sheets

(51) Int. Cl.
    *H01M 10/6563*     (2014.01)
    *B60K 1/04*     (2019.01)
    *H01M 10/6566*     (2014.01)
    *H01M 50/30*     (2021.01)

(52) U.S. Cl.
    CPC . *H01M 10/6563* (2015.04); *B60K 2001/0433* (2013.01); *H01M 2220/20* (2013.01)

(56) References Cited

U.S. PATENT DOCUMENTS

| | | |
|---|---|---|
| 2016/0301120 A1 | 10/2016 | Katsuno et al. |
| 2018/0015806 A1 | 1/2018 | Yasuda et al. |
| 2018/0226702 A1 | 8/2018 | Inoue et al. |
| 2020/0070808 A1* | 3/2020 | Ota ............ F02D 41/1401 |
| 2021/0159566 A1* | 5/2021 | Davies ............ H01M 50/264 |

FOREIGN PATENT DOCUMENTS

| | | | |
|---|---|---|---|
| JP | 2001-102099 A | 4/2001 | |
| JP | 2006-107788 A | 4/2006 | |
| JP | 2008-114706 A | 5/2008 | |
| JP | 2008-282548 A | 11/2008 | |
| JP | 2009-119935 A | 6/2009 | |
| JP | 2011-119102 A | 6/2011 | |
| JP | 2012-043591 A | 3/2012 | |
| JP | 2016-199106 A | 12/2016 | |
| JP | 2018-129179 A | 8/2018 | |
| WO | WO-2019113647 A1 * | 6/2019 | ........ H01M 10/0481 |

\* cited by examiner

BATTERY UNIT

CROSS-REFERENCE TO RELATED APPLICATIONS

The present application claims priority from Japanese Patent Application No. 2020-035289 filed on Mar. 2, 2020, the entire content of which is incorporated herein by reference.

TECHNICAL FIELD

The present invention relates to a battery unit.

BACKGROUND

JP-A-2018-129179 discloses a configuration in which a blower is disposed below a battery module in a power supply device, air discharged from the blower is sent to batteries, and air that has passed through between the batteries is taken into the blower again. Since the air taken in by the blower is sent through the batteries and is affected by a temperature of the batteries, the batteries cannot be adequately cooled. Therefore, in the power supply device described in JP-A-2018-129179, a heat exchanger is disposed below the blower.

SUMMARY

However, in the power supply device described in JP-A-2018-129179, since the heat exchanger is disposed in a case of the power supply device, the power supply device is increased in size and poor in layout property.

The present disclosure provides a battery unit capable of appropriately controlling a temperature of a battery and excellent in layout property.

According to an aspect of the present disclosure, there is provided a battery unit equipped in a vehicle. The battery unit includes: a battery; a case accommodating the battery; an upper surface covering material covering an upper surface of the battery in the case; an intake portion provided on the upper surface covering material and configured to take in air from an outside of the case to above the battery; a lower surface covering material covering a lower surface of the battery in the case; an exhaust portion provided on the lower surface covering material and configured to discharge air that has cooled or heated the battery; and a fan disposed below the lower surface covering material, configured to take in air discharged from the exhaust portion, and discharge the air between the lower surface covering material and a bottom surface of the case.

According to the present disclosure, since new air from the intake portion can be supplied to the battery, a temperature of the battery can be appropriately controlled. Further, since the heat exchanger may not be provided, the power supply device can be prevented from being increased in size and is excellent in layout property.

DESCRIPTION OF EMBODIMENTS

Figure 1:
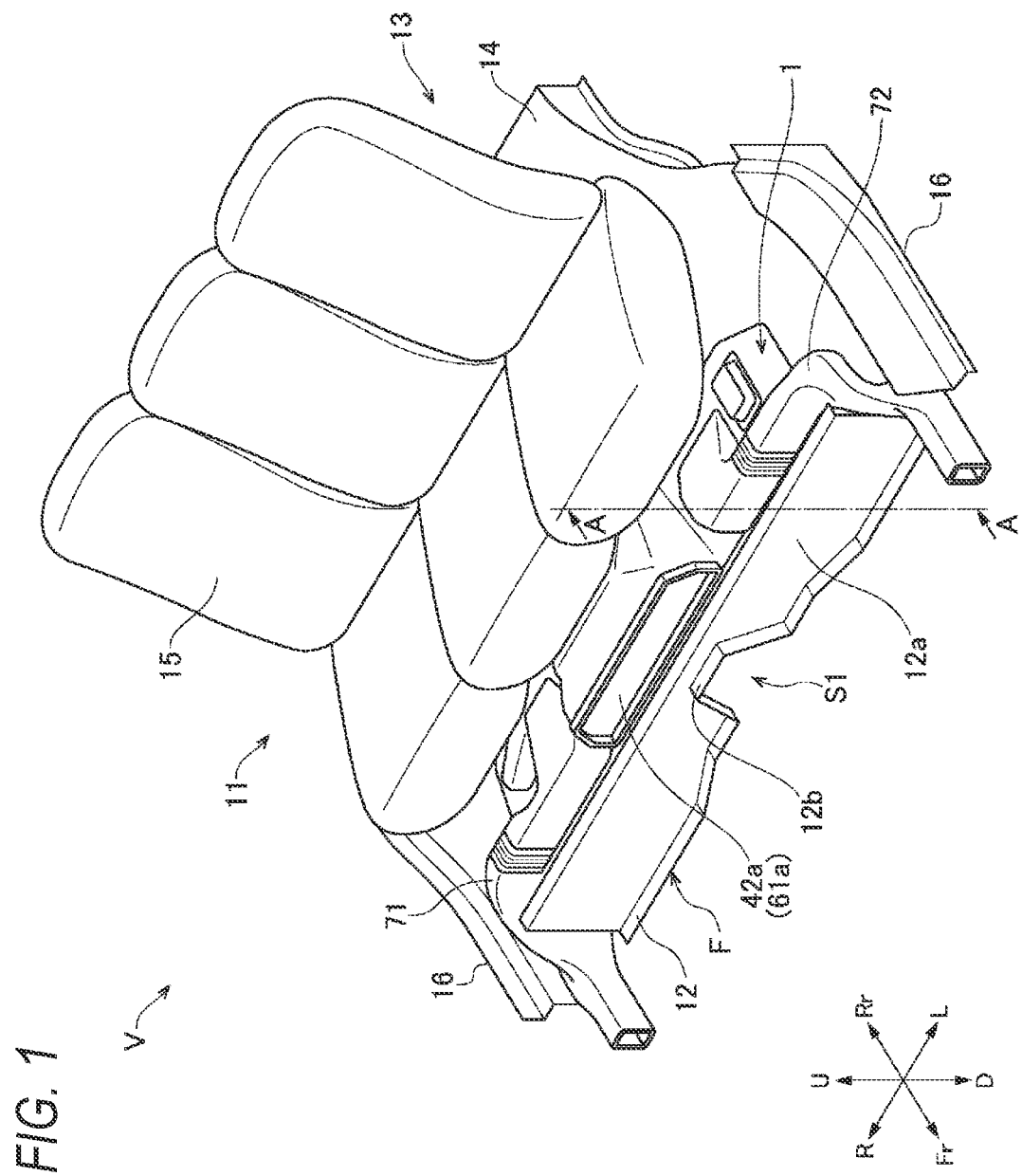
FIG. 1 is a perspective view of a periphery of a rear seat of a vehicle equipped with a battery unit according to an embodiment of the present invention as viewed from a front oblique upper side.

Hereinafter, an embodiment of the present invention will be described with reference to FIGS. 1 to 5. The drawings are to be viewed from a direction of reference numerals, and in the following descriptions, front, rear, left, right, upper and lower are based on directions viewed from a driver. A front side of a vehicle in the drawings is denoted by Fr, a rear side thereof is denoted by Rr, a left side thereof is denoted by L, a right side thereof is denoted by R, an upper side thereof is denoted by U, and a lower side thereof is denoted by D.

[Vehicle]

Figure 2:
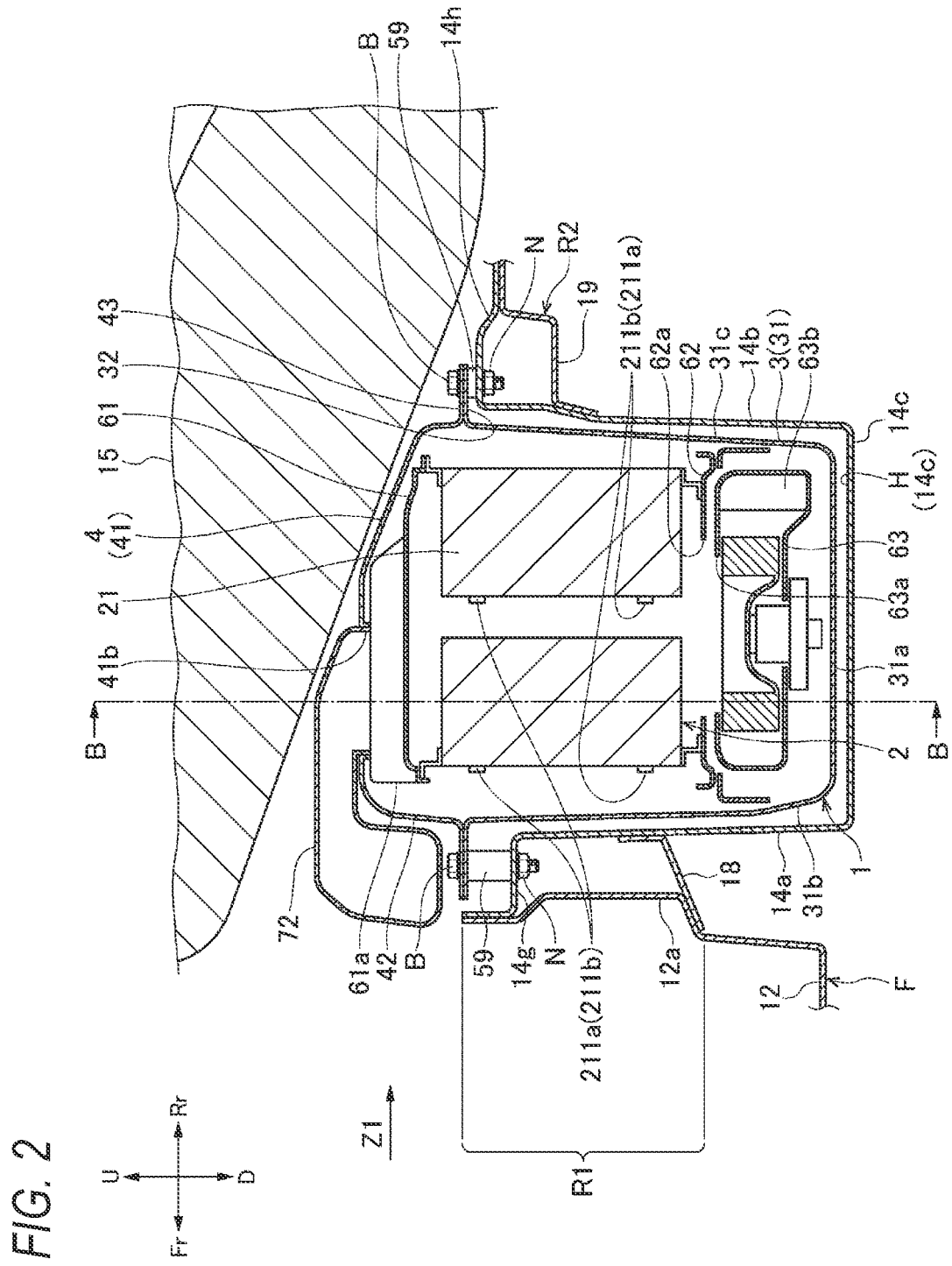
FIG. 2 is a cross-sectional view taken along a line A-A of FIG. 1.
Figure 3:
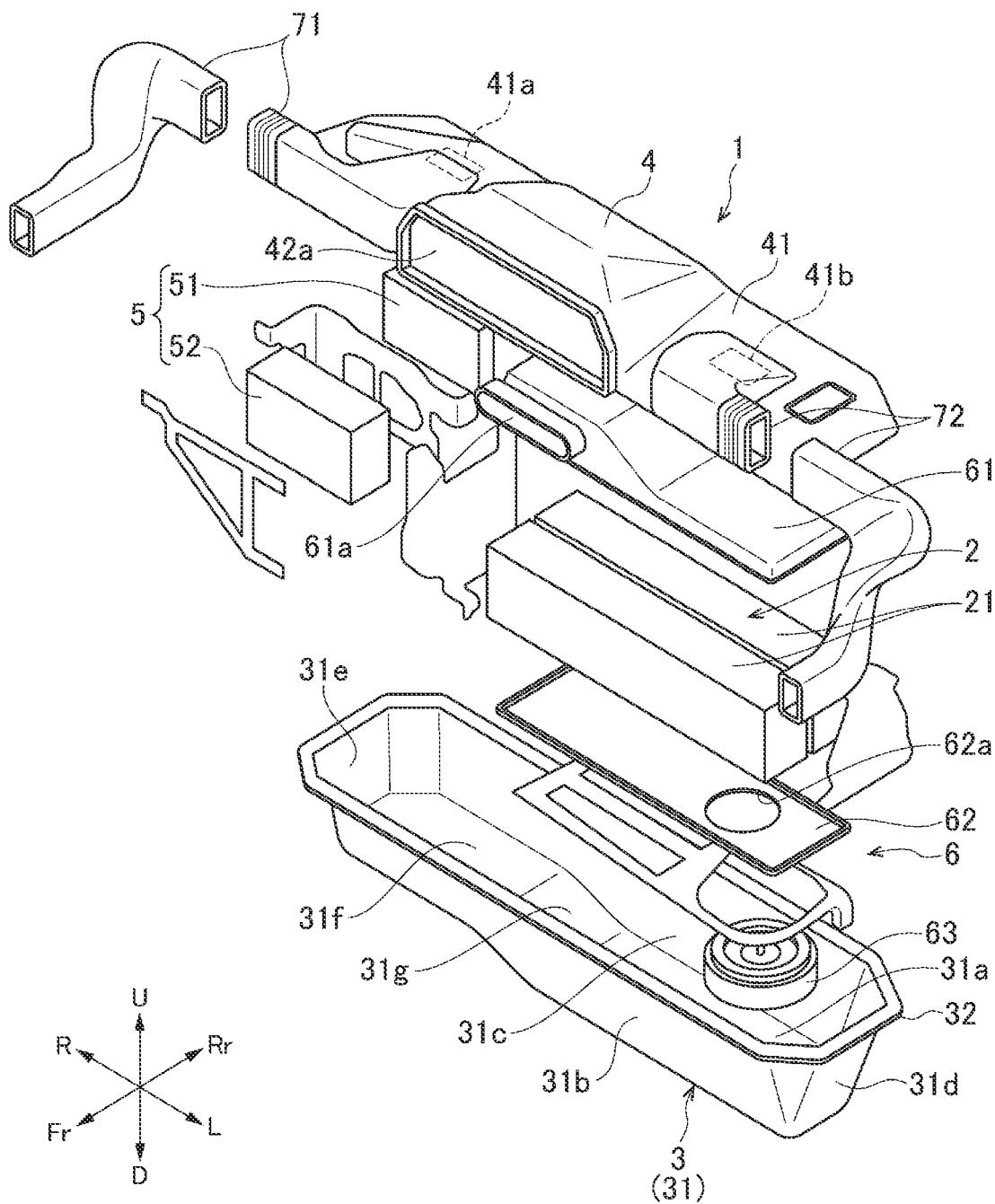
FIG. 3 is an exploded perspective view of the battery unit.
Figure 4:
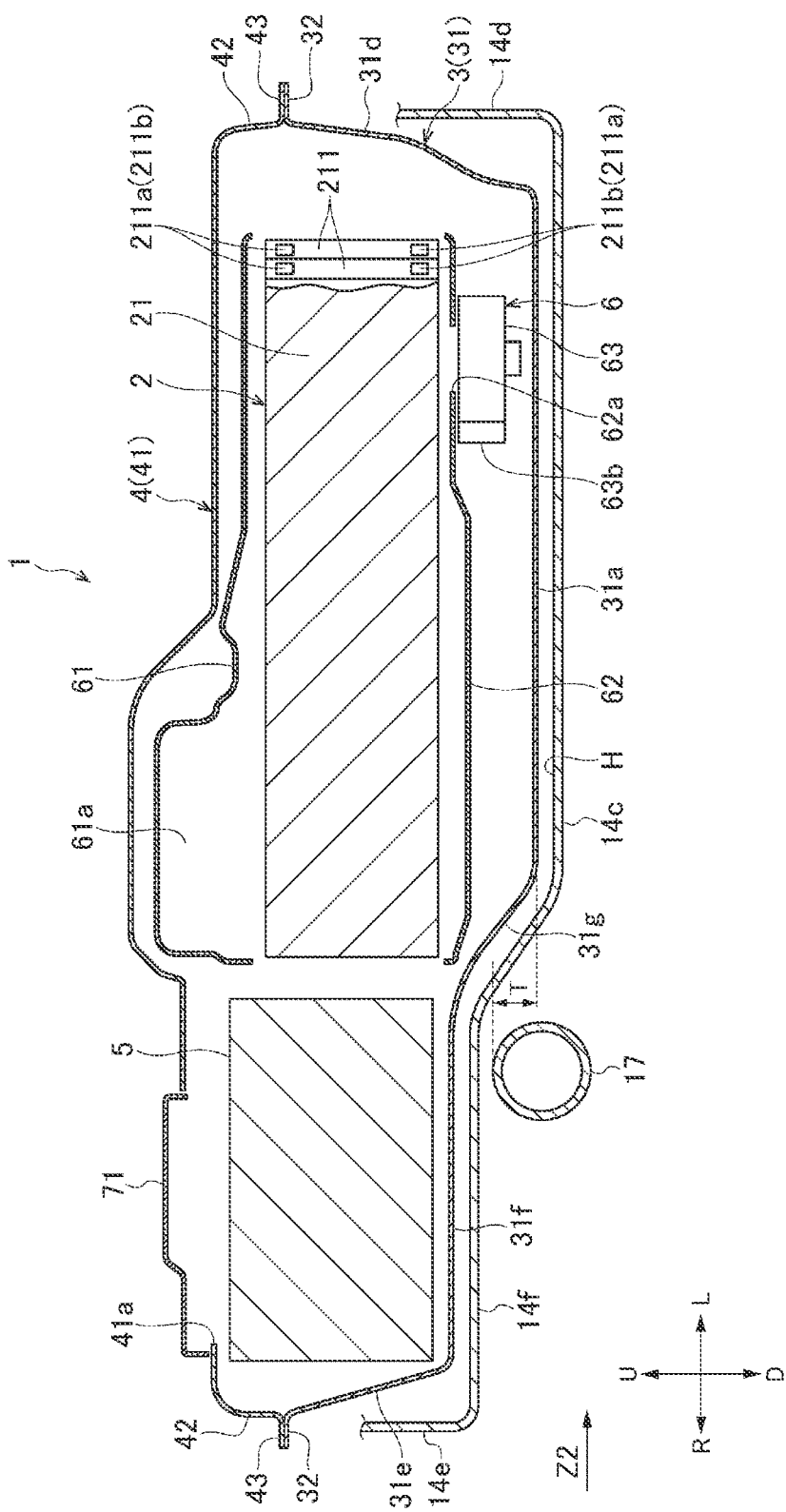
FIG. 4 is a cross-sectional view of a cross section taken along a line B-B of FIG. 2 as viewed from a front.

As shown in FIGS. 1 and 2, a vehicle V of the present embodiment is, for example, a hybrid vehicle, and is equipped with a battery unit 1 that accommodates batteries 2. The battery unit 1 is disposed in an accommodation recessed portion H formed in a floor panel F and is fastened to the floor panel F.

A front floor panel 12 constituting a floor portion of a vehicle interior 11 and a rear floor panel 14 constituting a floor portion of a cargo compartment 13 and the like are connected to each other below a rear seat 15, and both end portions of the floor panel F in a vehicle width direction are respectively connected to a pair of left and right frame members 16 each extending along a front-rear direction.

A kick-up portion 12a that rises upward is formed at a rear end portion of the front floor panel 12. A center tunnel 12b is formed along the front-rear direction at a central portion of the front floor panel 12 in the vehicle width direction. The center tunnel 12b is bent such that the front floor panel 12 is to be convex upward, and a trapezoidal tunnel space S1 is formed below the center tunnel 12b. In the tunnel space SI, an exhaust pipe 17 (see FIG. 4) and the like for discharging exhaust gas from an internal combustion engine (not shown) to a rear of the vehicle V are disposed.

The accommodation recessed portion H is formed in a front side of the rear floor panel 14, and the battery unit 1 is accommodated in the accommodation recessed portion H. The accommodation recessed portion H is a space surrounded by a front wall portion 14a, a rear wall portion 14b, a bottom portion 14c, a left side wall portion 14d, and a right side wall portion 14e, and a recessed portion 14f (see FIG. 4) through which the exhaust pipe 17 passes is provided in the bottom portion 14c so as to extend in the front-rear direction of the vehicle V.

As shown in FIG. 2, a front cross member R1 and a rear cross member R2 that cross over the left and right frame members 16 respectively are provided on a front side and a rear side of the accommodation recessed portion H. The front cross member R1 means a region between upper end portions of the kick-up portion 12a of the front floor panel 12 and a front end portion 14g of the rear floor panel 14, which are overlapped with each other, and a lower end portion of a front connecting member 18 extending from the front wall portion 14a of the accommodation recessed portion H to a height direction intermediate portion of the kick-up portion 12a. The front cross member R1 has a closed cross section formed by an upper portion of the kick-up portion 12a, the front end portion 14g of the rear floor panel 14, an upper portion of the front wall portion 14a of the accommodation recessed portion H. and the front connecting member 18. The rear cross member R2 has a closed cross section formed by an upper portion of the rear wall portion 14*b* of the accommodation recessed portion H, a rear floor portion 14*h* extending rearward from an upper end of the rear wall portion 14*b*, and a rear connecting member 19 connecting the rear floor portion 14*h* separated from the rear wall portion 14*b* and a height direction intermediate portion of the rear wall portion 14*b*.

[Battery Unit]

As shown in FIGS. 1 to 5, the battery unit 1 includes a case 3 and a lid 4 covering an opening of the case 3, and accommodates the batteries 2, a control device 5, a cooling component 6, and the like inside.

The case 3 is a member formed of a resin and having a laterally elongated substantially rectangular parallelepiped shape with an upper opening, and includes a case main body 31 opening upward, and annular flange portions 32 each extending outward from an opening edge portion of the case main body 31.

A front wall portion 31*b*, a rear wall portion 31*c*, a left side wall portion 31*d*, and a right side wall portion 31*e* are erected on the case main body 31 so as to surround a bottom portion 31*a* having a rectangular shape elongated in the vehicle width direction. In the case main body 31, the battery 2 is offset to a left side across a center in the vehicle width direction (left-right direction), and the control device 5 is adjacent to a right side. In a right side portion of the bottom part 31*a* of the case main body 31, a stepped recessed portion 31*f* recessed upward is formed along the front-rear direction of the vehicle V so as to correspond to the recessed portion 14*f* formed in the bottom portion 14*c* of the rear floor panel 14. The bottom portion 31*a* (left side portion) and the recessed portion 31*f* (right side portion) are continuous via an inclined portion 31*g* that is inclined upward from the left side (battery 2 side) toward the right side (control device 5 side). The inclined portion 31*g* has a region T overlapping the exhaust pipe 17 when viewed from the vehicle width direction (arrow Z2 direction in FIG. 4). In this way, the exhaust pipe 17 can be inserted into the recessed portion 31*f*, and downward protrusion of the exhaust pipe 17 can be prevented.

The lid 4 is a member that closes an opening of the case main body 31, and an upper surface of the lid 4 supports a front side of a seat portion of the rear seat 15 (a front side of buttocks). The lid 4 is formed with a ceiling portion 41 formed in a substantially rectangular shape substantially corresponding to the opening of the case main body 31, a vertical wall 42 in a substantially rectangular frame shape integrally hanging down from an outer peripheral edge of the ceiling portion 41, and flange portions 43 each extending outward from a lower end edge portion of the vertical wall 42 over an entire periphery.

An intake port 42*a* for taking in air in the vehicle interior 11 to an inside of the battery unit 1 is formed on a surface of the vertical wall 42 facing forward. Exhaust ports 41*a*, 41*b* for discharging the air in the battery unit 1 to the vehicle interior 11 are formed at two left and right positions of the ceiling portion 41.

The flange portion 43 is superposed on the flange portion 32 of the case 3 via an annular seal member (not shown). The overlapped flange portions 32, 43 are screwed into nuts N welded in advance to a lower side of the floor panel F by a plurality of bolts B inserted through the flange portions 32, 43 from above via collar members 59 interposed between the flange portions 32, 43 and the floor panel F.

The battery 2 includes a plurality of battery modules 21. Each battery module 21 is constituted by stacking a plurality of cells 211 in the vehicle width direction. The plurality of battery modules 21 are arranged in parallel in the front-rear direction of the vehicle V so as to overlap each other when viewed from the front of the vehicle V (arrow Z1 direction in FIG. 2).

Each cell 211 includes a positive electrode terminal 211*a* and a negative electrode terminal 211*b*. The positive electrode terminal 211*a* is connected to the negative electrode terminal 211*b* of the cell 211 adjacent to one side, and the negative electrode terminal 211*b* is connected to the positive electrode terminal 211*a* of the cell 211 adjacent to the other side, so that the plurality of cells 211 are connected in series.

The positive electrode terminal 211*a* and the negative electrode terminal 211*b* of the cell 211 are disposed so as to face the front of the vehicle V and overlap the front cross member R1 when viewed from the front (arrow Z1 direction in FIG. 2). In this way, an influence of an external input on the positive electrode terminal 211*a* and the negative electrode terminal 211*b* of the cell 211 can be reduced, and durability of the battery 2 can be enhanced. In a case where the positive electrode terminal 211*a* and the negative electrode terminal 211*b* of the cell 211 are disposed upward, the cell 211 may be affected by a load from the rear seat 15, and thus it is necessary to increase rigidity of the battery unit 1 in the upper-lower direction. In the present embodiment, since the front cross member R1 of the vehicle V is used, the durability of the battery 2 can be enhanced without increasing the rigidity of the battery unit 1.

The control device 5 includes a battery ECU 51 controlling charging and discharging of the battery 2, and a junction board 52 on which wiring connection components and the like are mounted. Although the battery 2 and the control device 5 are objects to be cooled by the cooling component 6, the control device 5 is less likely to be affected by heat than the battery 2, and thus cooling of the battery 2 is prioritized.

The cooling component 6 forms a cooling flow path through which the air in the vehicle interior 11 is taken into the battery unit 1, the battery 2 and the control device 5 are cooled by the taken-in air, and the cooled air is discharged to the cargo compartment 13. The cooling component 6 includes an upper surface covering material 61, a lower surface covering material 62, a fan 63, and the like.

The upper surface covering material 61 is a resin member covering upper surfaces of the batteries 2 in the case 3, and a space through which air can flow is formed between the upper surface covering material 61 and the upper surfaces of the batteries 2. Further, the upper surface covering material 61 is provided with an intake portion 61*a* that takes in air from an outside of the case 3 to above the batteries 2. The intake portion 61*a* opens forward, and takes in air from the vehicle interior 11 via the intake port 42*a* of the lid 4.

The lower surface covering member 62 is a resin member covering lower surfaces of the batteries 2 in the case 3, and a space through which air can flow is formed between the lower surface covering material 62 and the lower surfaces of the batteries 2. Further, the lower surface covering material 62 is provided with an exhaust portion 62*a* that discharges the air that has cooled the batteries 2 downward.

The fan 63 is disposed below the lower surface covering material 62, takes in the air discharged from the exhaust portion 62*a*, and discharges the air from between the lower surface covering material 62 and the bottom portion 31*a* of the case 3. The fan 63 of the present embodiment is a sirocco fan, and takes in air from an air port 63*a* formed in an upper surface portion, and discharges the air laterally from an exhaust port 63b formed in an outer peripheral portion.

According to such a configuration, the air outside the case 3 taken in from the intake portion 61a of the upper surface covering material 61 is supplied to the batteries 2, and the air discharged from the fan 63 is not directly supplied to the batteries 2 from the lower surface covering material 62, so that new air from the intake portion 61a can be supplied to the batteries 2. Accordingly, temperature of the batteries 2 can be appropriately controlled without providing a heat exchanger.

The intake portion 61a is disposed on one end side of the batteries 2 in the vehicle width direction, and the exhaust portion 62a is disposed on the other end side of the batteries 2 in the vehicle width direction with the batteries 2 interposed therebetween. For example, in the present embodiment, the intake portion 61a is disposed above a right end side of the batteries 2, and the exhaust portion 62a is disposed below a left end side of the batteries 2. In this way, the air flowing in from the intake portion 61a flows to the exhaust portion 62a located on an opposite side in the vehicle width direction (arrow Y1 in FIG. 5), so that the air can be supplied from one end side to the other end side of the batteries 2.

Figure 5:
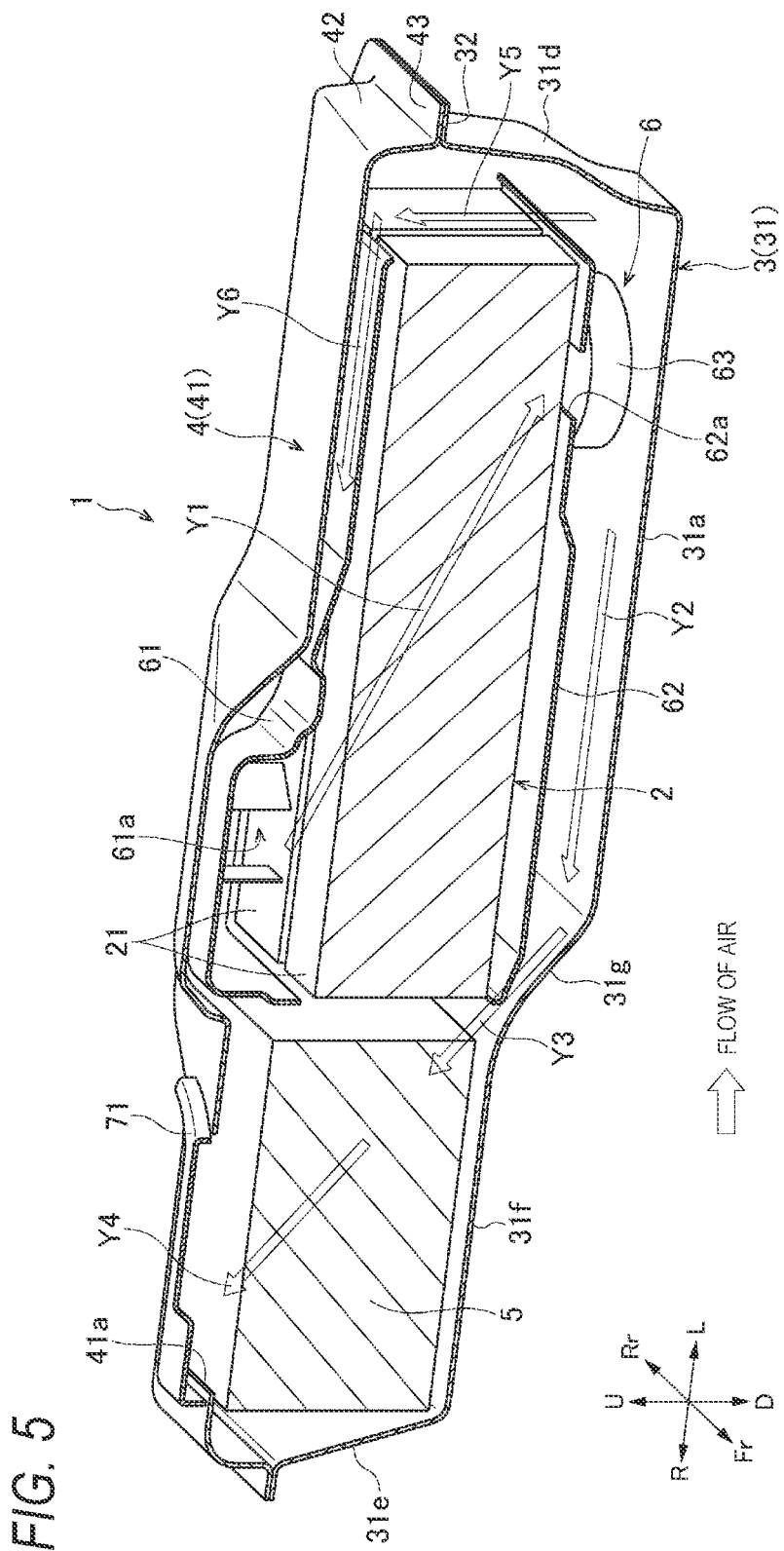
FIG. 5 is a cross-sectional perspective view of the cross section taken along the line B-B of FIG. 2 as viewed from the front oblique upper side.

The fan 63 is disposed so as to discharge the air from the exhaust port 63b toward the control device 5 disposed on the right side of the batteries 2 (arrow Y2 in FIG. 5). In this way, temperature of the control device 5 can also be controlled in addition to the temperature of the batteries 2.

Since the fan 63 is disposed on the left end side of the batteries 2, and the control device 5 is disposed on the right end side of the batteries 2 in the vehicle width direction, the exhaust gas from the fan 63, which has been heated by being affected by the heat of the batteries 2, is cooled while moving to the control device 5 located on an opposite side of the fan 63, and the control device 5 can be effectively cooled.

Further, the bottom portion 31a of the case 3 has the inclined portion 31g described above, and the inclined portion 31g is inclined upward from a fan 63 side toward the control device 5 side in the vehicle width direction, so that the exhaust air from the fan 63 can be more smoothly supplied to the control device 5 by the inclined portion 31g (arrow Y3 in FIG. 5).

The air supplied to the control device 5 passes through the control device 5 (arrow Y4 in FIG. 5), and then is discharged to the outside of the case 3 from the right exhaust port 41a of the lid 4. At this time, the air that has passed through the control device 5 is restricted from flowing into the batteries 2 by the upper surface covering material 61, and is reliably discharged to the outside of the case 3. A right external exhaust duct 71 is connected to the right exhaust port 41a, and the air discharged from the right exhaust port 41a is discharged to an appropriate position in the vehicle interior 11 via the right external exhaust duct 71.

Further, a part of the air discharged from the fan 63 passes through a space between left side surfaces of the batteries 2 and the left side wall portion 31d of the case 3 and a space between an upper surface of the upper surface covering material 61 and the lid 4, and is discharged from the left exhaust port 41b of the lid 4 to the outside of the case 3 (arrows Y5, Y6 in FIG. 5). At this time, the air that has passed through the control device 5 is restricted from flowing into the batteries 2 by the upper surface covering material 61, and is reliably discharged to the outside of the case 3. A left external exhaust duct 72 is connected to the left exhaust port 41b, and the air discharged from the left exhaust port 41b is discharged to an appropriate position in the vehicle interior 11 via the left external exhaust duct 72.

The above-described embodiments can be appropriately modified, improved, or the like. For example, in the above-described embodiment, the cooling component 6 for cooling the batteries 2 has been described, but the cooling component 6 may not only cool the batteries 2 but also heat the batteries 2, or may mainly heat the batteries 2. In addition, in the above-described embodiment, a hybrid vehicle is exemplified as the vehicle, but the present invention is not limited thereto, and the vehicle may be an electric vehicle such as an electric automatic vehicle or a fuel cell vehicle as long as the vehicle includes a battery.

At least the following matters are described in the present specification. It should be noted that although corresponding components in the above embodiment are shown in parentheses, the present invention is not limited thereto.

(1) A battery unit (battery unit 1) equipped in a vehicle (vehicle 1) includes:
  batteries (batteries 2);
  a case (case 3) accommodating the batteries;
  an upper surface covering material (upper surface covering material 61) covering upper surfaces of the batteries in the case;
  an intake portion (intake portion 61a) provided on the upper surface covering material and configured to take in air from an outside of the case to above the batteries;
  a lower surface covering material (lower surface covering material 62) covering lower surfaces of the batteries in the case;
  an exhaust portion (exhaust portion 62a) provided on the lower surface covering material and configured to discharge air that has cooled or heated the batteries, and
  a fan (fan 63) disposed below the lower surface covering material, configured to take in air discharged from the exhaust portion, and discharge the air between the lower surface covering material and a bottom surface (bottom portion 31a) of the case.

According to (1), the air outside the case taken in from the intake portion of the upper surface covering material is supplied to the batteries, and the air discharged from the fan is not directly supplied to the batteries from the lower surface covering material, so that new air from the intake portion can be supplied to the batteries. Accordingly, temperature of the batteries can be appropriately controlled without providing a heat exchanger. Further, since it is not necessary to provide the heat exchanger, layout property is excellent.

(2) The battery unit according to (1), in which
  the intake portion is disposed on one end side (left end side) of the batteries in a vehicle width direction, and
  the exhaust portion is disposed on another end side (right end side) of the batteries in the vehicle width direction with the batteries interposed therebetween.

According to (2), the air flowing in from the intake portion on one end side of the batteries flows to the exhaust portion located on an opposite side of the batteries in the vehicle width direction, so that the air can be supplied from the one end side to the other end side of the batteries.

(3) The battery unit according to (1) or (2) further includes:
  a control device (control device 5) disposed adjacent to the batteries in a vehicle width direction in the case and configured to control the batteries, in which
  the fan includes an exhaust port (exhaust port 63b) discharging air toward the control device.

According to (3), by supplying the exhaust gas from the fan after being supplied to the batteries to the control device, temperature of the control device can also be controlled in addition to the temperature of the batteries.

(4) The battery unit according to (3), in which
the intake portion is disposed on one end side of the battery in the vehicle width direction,
the exhaust portion is disposed on another end side of the batteries in the vehicle width direction with the batteries interposed therebetween,
the fan is disposed below the exhaust portion, and
the control device is disposed on the one end side of the batteries in the vehicle width direction.

According to (4), since the exhaust gas from the fan, which has been heated by being affected by the heat of the batteries, is cooled while moving to the control device located on an opposite side of the fan with the batteries interposed therebetween, the control device can be effectively cooled.

(5) The battery unit according to (3) or (4), in which
the bottom surface of the case includes an inclined portion (inclined portion 31g) inclined upward from the fan side toward the control device side in the vehicle width direction.

According to (5), the exhaust gas from the fan can be smoothly supplied to the control device by the inclined portion.

(6) The battery unit according to (5), in which
the inclined portion includes a region (region T) overlapping an exhaust pipe (exhaust pipe 17) configured to discharge exhaust gas from an internal combustion engine to a rear of the vehicle when viewed from the vehicle width direction.

According to (6), the inclined portion has the region overlapping the exhaust pipe configured to exhaust the exhaust gas from the internal combustion engine to the rear of the vehicle when viewed from the vehicle width direction.

(7) The battery unit according to any one of (1) to (6), in which
the battery includes a plurality of battery modules (battery modules 21), in each of which a plurality of cells (cells 211) are stacked in a vehicle width direction, arranged in parallel in a front-rear direction of the vehicle, and
the plurality of battery modules are disposed so as to overlap each other when viewed from front.

According to (7), air can be uniformly supplied to the plurality of battery modules, and a temperature control performance of the batteries is excellent.

(8) The battery unit according to any one of (1) to (7), in which
the vehicle includes a cross member (front cross member R1) extending in a vehicle width direction,
the case is provided under a seat (rear seat 15),
a positive electrode terminal (positive electrode terminal 211a) and a negative electrode terminal (negative electrode terminal 211b) of a cell of the battery are disposed toward a front of the vehicle, and
the positive electrode terminal and the negative electrode terminal are disposed so as to overlap the cross member when viewed from the front.

According to (8), since the positive electrode terminal and the negative electrode terminal of the cell disposed toward the front are disposed so as to overlap the cross member when viewed from the front, an influence of an external input on the positive electrode terminal and the negative electrode terminal of the cell can be reduced, and durability of the battery can be enhanced.

What is claimed is:

1. A battery unit equipped in a vehicle comprising:
a battery;
a case accommodating the battery;
an upper surface covering material covering an upper surface of the battery in the case;
an intake portion provided on the upper surface covering material and configured to take in air from an outside of the case to above the battery;
a lower surface covering material covering a lower surface of the battery in the case;
an exhaust portion provided on the lower surface covering material and configured to discharge air that has cooled or heated the battery;
a fan disposed below the exhaust portion, configured to take in air discharged from the exhaust portion, and discharge the air between the lower surface covering material and a bottom surface of the case; and
a control device disposed adjacent to the battery in a vehicle width direction in the case and configured to control the battery,
wherein the intake portion is disposed on one end side of the battery in the vehicle width direction,
wherein the exhaust portion is disposed on another end side of the battery in the vehicle width direction with the battery interposed therebetween,
wherein the control device is disposed on the one end side of the battery in the vehicle width direction, and
wherein the fan includes an exhaust port discharging the air toward the one end side in the vehicle width direction, the air discharged from the exhaust port is supplied to the control device through a space between the lower surface covering material and the bottom surface of the case, and the air is discharged to the outside of the case.

2. The battery unit according to claim 1,
wherein the bottom surface of the case includes an inclined portion inclined upward from the fan toward the control device in the vehicle width direction.

3. The battery unit according to claim 2,
wherein the inclined portion has a region overlapping an exhaust pipe configured to discharge exhaust gas from an internal combustion engine to a rear of the vehicle when viewed from the vehicle width direction.

4. The battery unit according to claim 1,
wherein the battery includes a plurality of battery modules, in each of which a plurality of cells are stacked in a vehicle width direction, arranged in parallel in a front-rear direction of the vehicle, and
wherein the plurality of battery modules are disposed so as to overlap each other when viewed from front.

5. The battery unit according to claim 1,
wherein the vehicle includes a cross member extending in a vehicle width direction, wherein the case is provided under a seat,
wherein a positive electrode terminal and a negative electrode terminal of a cell of the battery are disposed toward a front of the vehicle, and
wherein the positive electrode terminal and the negative electrode terminal are disposed so as to overlap the cross member when viewed from the front.

* * * * *